United States Patent
Audren et al.

(10) Patent No.: US 6,907,966 B2
(45) Date of Patent: Jun. 21, 2005

(54) LINEAR ACTUATOR, IN PARTICULAR AN AIRCRAFT BRAKE ACTUATOR

(75) Inventors: Jean-Thierry Audren, Saint-Remy-les Chevreuses (FR); Patrick Szebesta, Oulins-Anet (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 10/477,780

(22) PCT Filed: May 16, 2002

(86) PCT No.: PCT/FR02/01651

§ 371 (c)(1),
(2), (4) Date: Mar. 26, 2004

(87) PCT Pub. No.: WO02/093728

PCT Pub. Date: Nov. 21, 2002

(65) Prior Publication Data

US 2004/0169424 A1 Sep. 2, 2004

(30) Foreign Application Priority Data

May 16, 2001 (FR) .............................. 01 06440

(51) Int. Cl.⁷ .............................................. F16D 65/36
(52) U.S. Cl. ...................................... 188/161; 188/156
(58) Field of Search .............................. 188/72.4, 72.8, 188/156, 164

(56) References Cited

U.S. PATENT DOCUMENTS

| | | | | |
|---|---|---|---|---|
| 4,602,702 A | * | 7/1986 | Ohta et al. .................. | 188/72.1 |
| 5,172,798 A | * | 12/1992 | Mabee ...................... | 192/18 B |
| 5,348,123 A | * | 9/1994 | Takahashi et al. ......... | 188/72.1 |
| 6,340,077 B1 | * | 1/2002 | Schaffer ..................... | 188/156 |

FOREIGN PATENT DOCUMENTS

| | | |
|---|---|---|
| EP | 0296703 | 12/1988 |
| FR | 2782420 | 2/2000 |
| JP | 2001-086700 | 3/2001 |

* cited by examiner

Primary Examiner—Christopher P. Schwartz
(74) Attorney, Agent, or Firm—Blakely Sokoloff Taylor & Zafman

(57) ABSTRACT

A linear actuator comprises a piston and a rotary electric motor together with means which are interposed between the electric motor and the piston to define a mechanical system for transforming rotary movement of the motor into linear displacement of said piston, the actuator is characterized in that the electric motor is a vibration type motor comprising at least a stator and a rotor together with excitation means for deforming said stator and/or said rotor in modes of vibration combining tangential vibration and normal vibration for driving said rotor in rotation, and in that the means interposed between the electric motor and the piston include means for mechanically decoupling said piston from said electric motor in the event of the electrical power supply to the elector motor being interrupted.

11 Claims, 3 Drawing Sheets

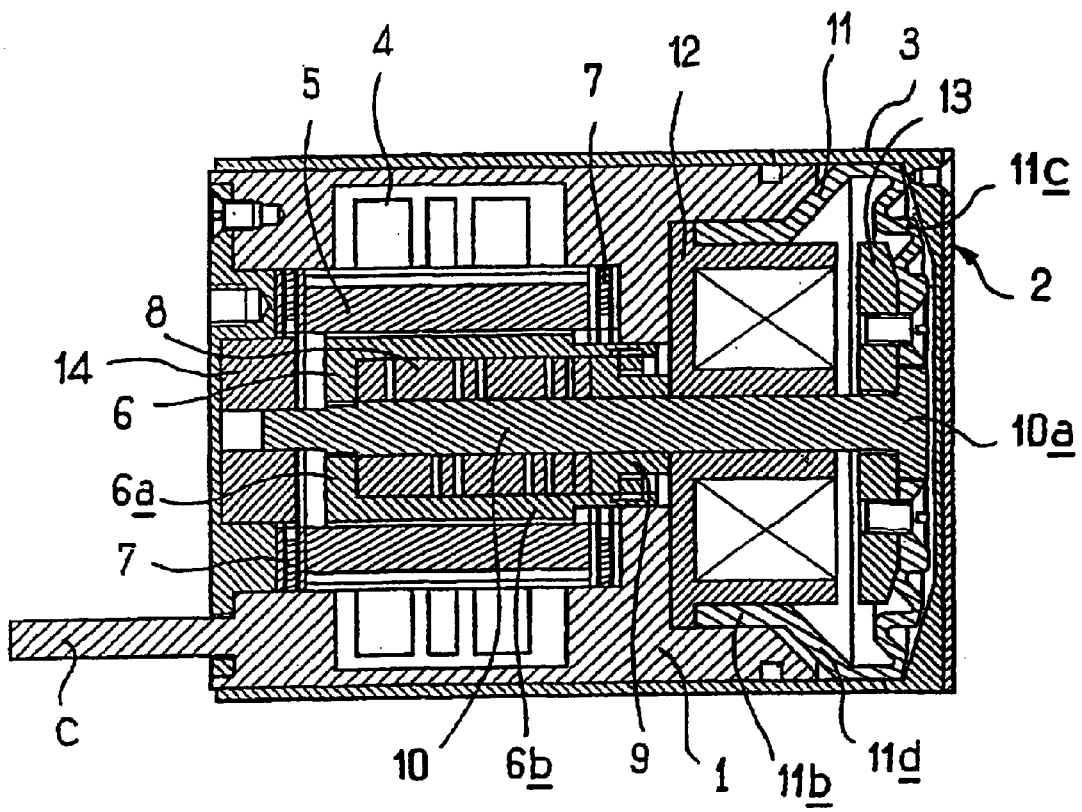
FIG_1
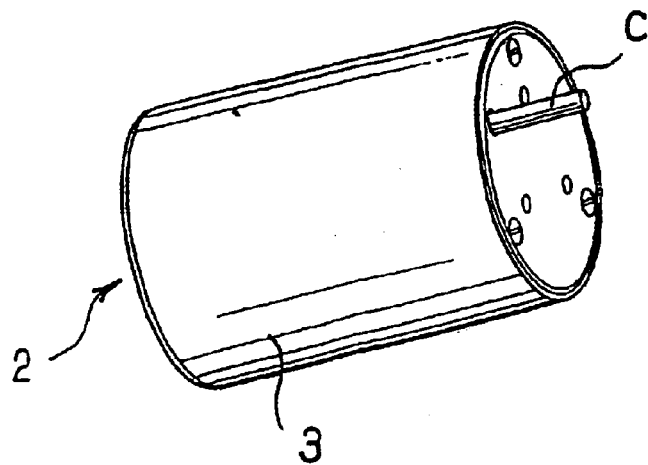
FIG_2

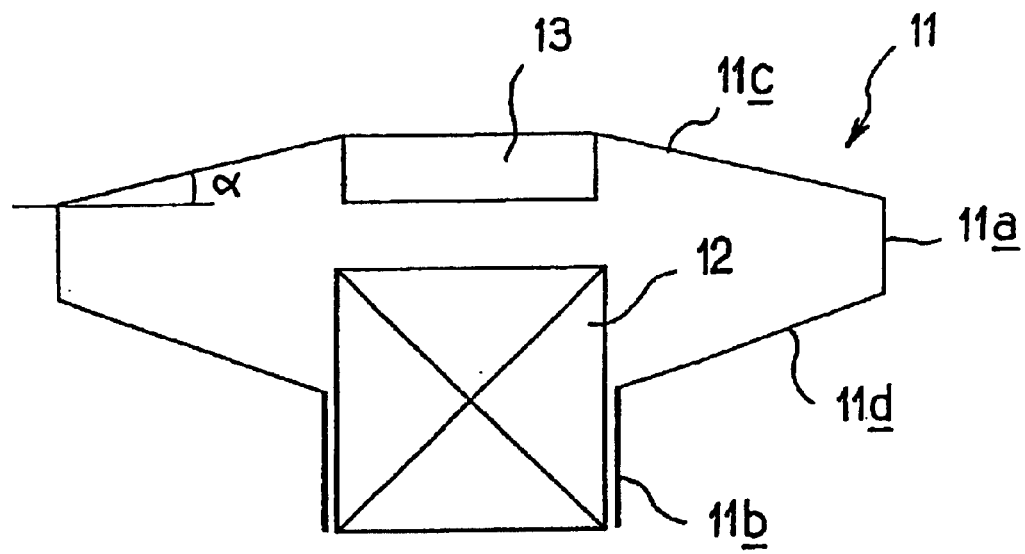
FIG_3
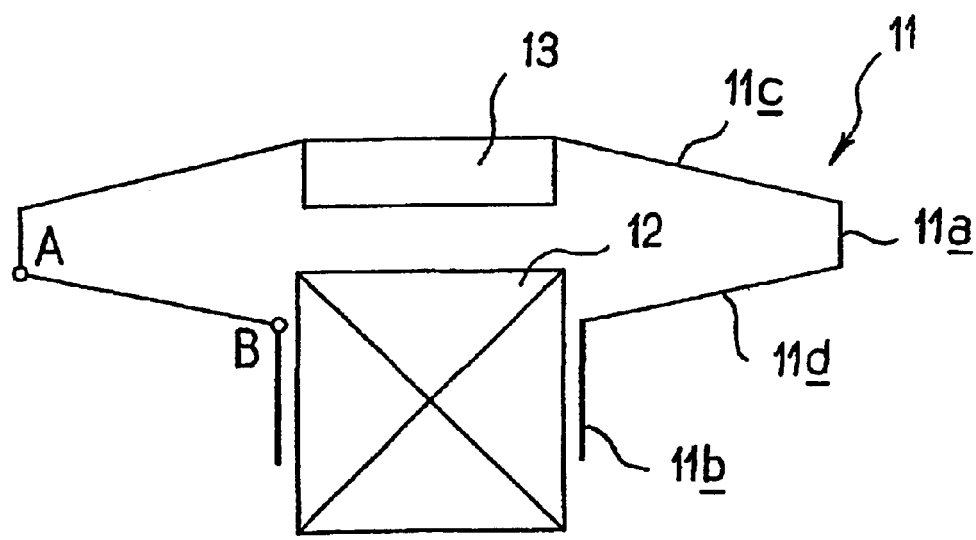
FIG_4

LINEAR ACTUATOR, IN PARTICULAR AN AIRCRAFT BRAKE ACTUATOR

The present patent application is a non-provisional application of International Application No. PCT FR02/01651, filed May 16, 2002.

GENERAL FIELD OF THE INVENTION AND STATE OF THE ART

The present invention relates to linear actuators.

Advantageously, but in non-limiting manner, it is applicable to the field of brakes, in particular aircraft brakes.

At present, aircraft brakes are actuated by means of hydraulic pistons.

Such actuators nevertheless present drawbacks associated with the use of a hydraulic fluid: risks of leakage; need for a power generator; etc. . . .

For reasons of cost, safety, and limiting pollution, it is desirable to replace such hydraulic actuators with electric actuators.

Proposals have already been made for various solutions based on electromagnetic motors.

In general, movement from the motor is transmitted to a piston via a system of gears and a screw transforming rotary movement into rectilinear movement.

That mechanism is reversible so that in the event of a failure in the electrical power supply, the brake is not held on.

The high speed reduction ratio provided by the gears serves to obtain a high level of force without requiring excessive torque from the motor.

Such a structure with speed-reducing gears enables the weight and the cost of the motor to be minimized.

In spite of that, electromechanical brakes that have been made or proposed still present weight that is too great.

In addition, the high level of speed reduction in association with the inertia of the motor rotor gives rise to very high levels of energy consumption when control signals are applied at high frequency (while the actuator is approaching and during anti-lock servo-control) and the level of consumption bears little relationship to the amount of energy actually necessary for clamping the disks together.

So-called "vibration " (or "ultrasonic ") electric motor structures are also known, in particular from patent applications FR 97/10948, FR 98/10391, and FR 00/03084 in the name of the Applicant which present the advantages of enabling high levels of torque to be delivered and, for equivalent power, of presenting particularly low weight.

Nevertheless, vibration motors suffer from the drawback of jamming if there is a loss of power, and that is, a priori, difficult to make compatible with their use in braking systems, in particular for aircraft brakes, since it is usually a requirement in that type of application to be able to release the brakes fully, merely by interrupting their power supply, specifically for the purpose of avoiding highly asymmetrical braking while landing.

Japanese patent application 2001-086 700 discloses a linear actuator which includes a vibration motor and an electromagnet.

The structure proposed in that document presents the drawback of presenting driving strokes that are particularly small. Its weight an inertia remain large.

SUMMARY OF THE INVENTION

The invention proposes an actuator structure, in particular for a brake actuator, which is of the electrical type, but which makes it possible to achieve particularly low levels of weight and energy consumption.

In particular, the invention provides an actuator structure which uses a vibration type motor instead of an electromagnetic motor, thus making it possible:

firstly to deliver very high torque at low speed, and consequently to omit the gearing (saving in weight) and to reduce the apparent inertia (saving in energy consumption); and secondly to obtain a significant saving in weight.

The proposed structure enables the actuator to be released completely in the event of the electrical power supply being interrupted.

It presents the advantage of enabling a long driving stroke to be obtained, in particular a stroke that is suitable for compensating brake disk wear.

The invention also proposes an actuator structure which is suitable not only for performing the main braking function, but is also suitable for performing a "parking" brake function.

Thus, the invention provides a linear actuator comprising a body having a piston and a rotary electric motor mounted thereon, together with means which are interposed between the electric motor and the piston and which define a mechanical system that transforms the rotary movements of the motor into linear displacements of said piston, the electric motor being a vibration type motor comprising at least a stator and a rotor together with excitation means for deforming said stator and/or said rotor in modes of vibration that combine tangential vibration with normal vibration so as to drive the rotor in rotation, the means interposed between the electric motor and the piston including means which mechanically decouple said piston from said electric motor when the electrical power supply thereto is interrupted, said means comprising an electromagnet suitable for holding a complementary pole piece in a given position when it is powered, the actuator being characterized in that the piston is secured to a skirt suitable for sliding on the body in order to guide the piston in its axial displacement, the electromagnet and/or the pole piece acting on a part which becomes blocked by friction against the guide skirt which is secured to the piston, or on the contrary becomes disengaged, depending on whether or not the electromagnet is powered.

Such an actuator is advantageously associated with the various characteristics below, taken singly or in any feasible combination:

the part which becomes blocked by friction against the guide skirt secured to the piston is a part that is generally bell-shaped, presenting firstly a foot-forming portion secured to one or other of the two parts constituting the electromagnet and the pole piece, and secondly a dome-forming portion which is secured to the other one of said two parts and which constitutes a spring that, when the electromagnet is powered and the pole piece is pressed thereagainst, pushes back an intermediate portion between the dome-forming portion and the foot-forming portion so as to block said intermediate portion and the bell-forming part as a whole by friction against the guide skirt secured to the piston;

the electromagnet is suitable for being displaced axially towards the piston by an element presenting a thread that meshes with the thread of a nut-forming part, which is itself driven in rotation by the vibration motor, actuation of the vibration motor causing the part which meshes with the nut-forming part and the electromagnet to be displaced axially;

the element presenting a thread which meshes with the thread of the nut-forming part to drive the electromagnet in axial displacement is a hollow element in which there is received a spring that is compressed with some minimum level of prestress between an end wall presented by said hollow element and a part which is suitable for sliding in said hollow element and for coming into abutment against the electromagnet, the actuator including means for acting, where appropriate, to cause the vibration motor to exert a force that is greater than the prestress of the spring;

the electromagnet, the pole piece, and the element which meshes with the nut-forming part have a rod passing axially therethrough which is terminated by a bearing head suitable for coming into abutment against the pole piece, said rod having an outside thread which co-operates with a complementary thread presented by the nut-forming part, a second rotary motor being suitable for rotating said rod and thus driving it in axial displacement by virtue of its thread co-operating with the complementary thread presented by the nut-forming part;

the guide skirt and the intermediate portion of the bell-forming part which is designed to become blocked by friction against said guide skirt are coated in a pair of friction layers presenting static and dynamic coefficients of friction which are greater than 0.6 between the skirt and the piston of less than 100 megapascals (mpa), said pair of friction layers further presenting surface states such that:

their roughness radii of curvature R satisfy:
0.005 millimeters (mm)<<R <<1 mm; and the arithmetic mean wavelength $\lambda_a$ and the root mean square (rms) wavelength $\lambda_q$ of the roughness satisfy:
0.5 micrometers ($\mu$m)<$\lambda_a$ and $\lambda_a$<10 $\mu$m;

the dome-forming portion forms an angle of 0.50° or less relative to a plane perpendicular to the axis of the piston;

the foot-forming portion of the dome-forming part is connected to the intermediate portion that forms a friction zone via a portion that lies substantially in the vicinity of the friction cone;

the actuator includes a ring surrounding the guide skirt in the immediate vicinity of its zone that is designed to be engaged by the bell-forming part; and the actuator includes spring-forming means which hold said ring in the axial direction relative to the guide skirt.

The invention also provides a brake, in particular an aircraft brake, comprising friction disks and an actuator as defined above. dr

BRIEF DESCRIPTION OF THE FIGURES

Embodiments of the invention are described below by way of example and with reference to the accompanying drawings, in which:

FIG. 1 is a section view showing a possible embodiment of the invention;

FIG. 2 is a perspective view showing the same embodiment of the invention;

FIG. 3 is a diagram of the bell-forming part of the actuator of FIGS. 1 and 2, with the electromagnet and the pole piece associated therewith;

FIG. 4 is another diagram of the bell-forming part of the actuator of FIGS. 1 and 2, with the electromagnet and the pole piece associated therewith.

DESCRIPTION OF EMBODIMENTS OF THE INVENTION

Structure of the Actuator

Figure 5A:
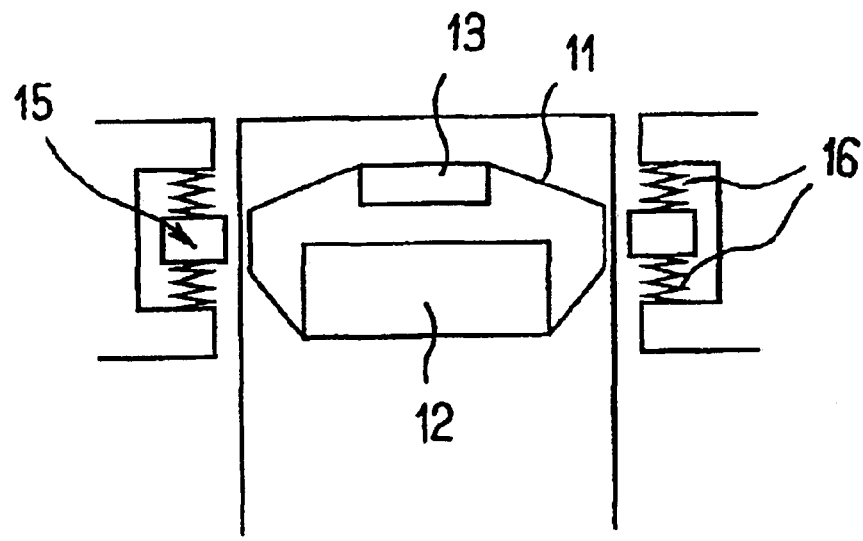
FIGS. 5a and 5b are diagrams showing a detail of a possible additional embodiment of the invention, the guide skirt, the electromagnet, the pole piece, and bell-forming part being shown in these figures both for the case when the electromagnet is not powered (FIG. 5a), and for the case when the electromagnet is powered (FIG. 5b).

The actuator which is shown in the figures comprises a main body 1 of generally cylindrical shape and a piston 2 which is designed to be moved axially relative to said body 1, being guided in axial displacement relative thereto by a cylindrical skirt 3. This guide skirt 3 is suitable for sliding on said body 1 and it is terminated by the piston 2.

For example, when the actuator is used as an aircraft brake actuator, the piston 2 is intended firstly to be moved in order to take up any clearance relative to a set of friction disks with which said actuator is associated, and secondly to apply a force on said disks tending to press them against one another in order to achieve braking.

The actuator which is shown in the figures further comprises a vibration motor 4 which is mounted coaxially inside the body 1.

The motor 4 is, in particular, advantageously of the type described in the Applicant's French patent applications Nos. FR 97/10948, FR 98/10391, and FR 00/03084. It comprises in particular at least one rotor disk disposed between two stator disks, together with active elements for tangential and normal deformation which are excited in such a manner as to deform the stator disks in application of operating sequences which serve to drive the rotor disk(s) in rotation.

These active elements are advantageously of the piezoelectric type.

The actuator also includes a nut 5 which extends through the rotor-and-stator-forming disks of said motor 4, coaxially therewith.

The nut 5 presents an inside thread which co-operates with an outside thread on a coaxial element 6 of cylindrical shape, co-operation between said nut 5 and said coaxial element 6 enabling rotary movement of the rotor of the motor 4 to be transformed into movement in translation along the general axis of the actuator.

For this purpose, the nut 5 is constrained to rotate with the rotor disk(s) of the motor 4 and is held axially relative to the body 1 of the actuator by means of abutments 7 which allow it to rotate inside the body 1 and which oppose reaction forces that are colinear with the axis.

The cylindrically-shaped element 6 is a hollow element presenting an end wall 6a and a cylindrical body 6b.

It receives a spring 8 which is compressed between the end wall 6a and a part 9 which terminates the hollow element 6 at its end remote from said end wall 6a.

The part 9 is suitable for being slid into the hollow element 6 when sufficient force for overcoming the spring force is exerted on said part 9.

In the absence of such a force, this part is pushed into a position where it is blocked by abutments presented by the element 6 and where it is constrained to move together therewith both in translation and in rotation.

Furthermore, the assembly constituted by the nut 5, the element 6, the spring 8, and the part 9, has an inner rod 10 passing therethrough, which rod is terminated by a T-shaped bearing head 10a.

A pole piece 13 is slidably mounted on said rod 10 and is suitable for coming into abutment against the bearing head 10a. This pole piece 13 co-operates with an electromagnet 12 also mounted to slide relative to the rod 10.

A bell-shaped part 11 is mounted between the electromagnet 12 and the pole piece 13.

The bell-shaped part 11 presents:

an annular portion 11a for being pushed against the inside wall of the cylindrical skirt 3 and which constitutes a zone that is intended to block the cylindrical skirt 3 and the piston relative to said part 11 by friction;

a portion 11b constituting the foot of said bell-shaped part 11 and which is extended by the portion 11a that constitutes the friction zone, the portion 11b being secured to the electromagnet 12 which is suitable for sliding relative to the body 1; and a dome-forming portion 11c which extends the annular friction portion 11a from its end remote from the foot-forming portion 11b, the dome-forming portion 11c being a deformable portion constituting a spring which, depending on its position relative to the foot-forming portion 11b, is suitable either for exerting a radial elastic force on the friction portion 11a, this force then blocking the skirt 3 and the piston 2 relative to the part 11, or else for releasing said portion 11a so as to disengage it from the inside wall of the skirt 3.

The dome-forming portion 11c is secured to the pole piece 13, e.g. by means of a screw.

When the electromagnet 12 is powered, it is suitable for holding the pole piece pressed against the electromagnet, with the dome-forming portion 11c being urged to block the skirt 3 and the piston 2 relative to the assembly constituted by the electromagnet 12 and the pole piece 13.

In addition, the rod 10 passes through the end wall 6a of the threaded element 6 via an orifice that said end wall 6a presents, this orifice defining a sleeve having an inside thread that co-operates with a complementary outside thread presented by the rod 10.

Said rod 10 is also itself suitable for being driven in rotation about its axis by a motor 14 which drives it via fluting.

This motor is preferably a vibration motor of the type described in the above-specified applications.

The figure also shows a power supply cable C for delivering electricity to the motor 4, to the electromagnet 12, and to the motor 14.

Operation

The above-described structure operates as follows.

Preparatory Stage

At rest, the device is as shown in FIG. 1.

In order to prepare the actuator, the main motor 4 is actuated so as to move the element 6 towards the rear end of the actuator, i.e. towards the motor 14 in the example shown in the figures.

In its axial displacement, this element 6 begins by entraining the rod 10, the pole piece 13, and the part 11, thereby also entraining the electromagnet 12.

Once the electromagnet 12 comes into abutment against the end wall of the housing in which it is received in the body 1, the pole piece 13 approaches the electromagnet 12 such that the dome-forming portion 11b deforms and the annular friction portion 11a becomes blocked against the inside wall of the guide skirt 3.

The electromagnet 12 is then powered, thereby blocking the pole piece 13 and the electromagnet 12 against each other and ensuring that the part 11 is blocked relative to the guide skirt 3 and the piston 2.

The motor 4 is then actuated in the reverse direction, thereby disengaging the bearing head 10a of the rod 10 from the pole piece 13 and the electromagnet 12.

The actuator is then ready for use: because of the blocking achieved by the angular friction portion 11a, all movements transmitted by the element 6 to the electromagnet 12 are transmitted to the piston 2.

Main Braking

Specifically for the purpose of performing main braking, the motor 4 is actuated. Once the element 6 has taken up its clearance and bears against the electromagnet 12, it moves the piston axially until it presses against the friction disks of the brake; the motor 4 is then actuated to exert torque which presses hard against the disks and performs braking.

The thrust of the electromagnet 12 against the element 6 is conserved even when said element 6 reverses, and this continues so long as the brake disks are under pressure.

It should be observed that in the event of an untimely loss of electrical power supply during braking, the electromagnet 12 and the pole piece 13 are released relative to each other.

The part 11 is then no longer under tension and the piston 2 is no longer blocked relative to the electromagnet 12 and the element 6.

Consequently, the proposed structure enables the braking system to be released immediately in the event of the electrical power supply being interrupted.

Parking Brake

In order to perform the parking brake function, the above-described main braking sequence is performed.

However, the motor 4 is controlled so as to apply clamping force to the brakes that corresponds to a force greater than that for main braking.

This force overcomes the prestress of the spring 8 located inside the element 6, such that the part 9 enters into the element 6 and compresses the spring a little more, thus ensuring in the event of the disks shrinking due to cooling the spring can expand so as to maintain the pressure force on the brake.

The motor 14 is then actuated to reverse the bearing head 10a until it comes into contact with the pole piece 13.

The power to the electromagnet 12 can then be switched off without the piston decoupling from said electromagnet 12.

In this way, the clamping of the brake achieved by the actuator is maintained after the electrical power supply has been switched off.

The spring 8 serves to maintain constant clamping force even in the event of the friction disks of the brake shrinking as they cool down.

In order to take off the parking brake, it suffices subsequently to apply the reverse sequence: power the electromagnet 12, disengage the head 10a from the pole piece 13 by actuating the motor 14, and then switch off the power supply to the electromagnet 12.

Additional Implementation Details

There follow details of additional features that are advantageous.

Coefficient of Friction between the Piston and the Electromagnet

In order to work with small forces, thereby enabling the weight of the parts to be kept down and also enabling electromagnetic power consumption to be kept down, it is preferable for the contact material between the skirt 3 and the part 11 to have a coefficient of friction that is as high as possible.

Such materials are advantageously of the type described in the Applicant's French patent application No. FR 01/00524.

The contact layers on the skirt 3 and the part 11 are advantageously constituted by pairs of friction layers presenting static and dynamic coefficients of friction which are greater than 0.06 for stress between the skirt and the piston of less than 100 MPa, said pair of friction layers further presenting surface states such that:

their roughness radius of curvature R satisfies:
0.005 mm<<R<<1 mm; and the arithmetic mean wavelength $\lambda_a$ and the rms wavelength $\lambda_q$ of the roughness satisfy:
0.5 µm<$\lambda_q$ and $\lambda_a$<10 µm For examples of materials that satisfy these conditions, reference can advantageously be made to the above-mentioned patent application.

Design of the Portion 11c Forming a Dome/Spring

The expansion force needed for operation of the dome-forming portion 11c and for tensioning the annular portion 11a is given by the maximum load on the piston and by the coefficient of friction. In order to ensure that this does lead to the electromagnet needing to maintain a large force, the system is designed so that the angle of inclination α (FIG. 3) between the dome-forming portion 11c and a plane perpendicular to the axis of the actuator is as small as possible, but without becoming negative since that would prevent the device from releasing in the event of a power failure.

By way of example the following value is taken:

$F_{max}$=20,000 Newtons (N) on the piston

If K is the coefficient of friction, then the force developed by the electromagnet must be equal to:

$$F_e = \frac{F_{max}}{K} \times \sin \alpha$$

which for K=0.5 and α=0.05°, gives $F_e$=400 N.

Design of the Part 11

The shape of the part 11, and more particularly of the portion 11d connecting the foot-forming portion 11b to the friction annular portion 11a is selected to encourage partial jamming or chocking to minimize the force that needs to be exerted by the diaphragm.

As shown in FIG. 4, the closer this portion 11d (segment AB) comes to the normal, the greater the jamming effect; when the segment AB is on the edge of the friction cone, the force to be exerted by the electromagnet becomes zero, but the device might remain jammed at the slightest variation in the friction coefficient.

An inclination is therefore selected for the zone 11d relative to the normal to the piston so as to be as close as possible to the friction cone while always remaining outside it whatever the variation.

For example, for a nominal friction cone corresponding to a half-angle of 45°, and a maximum friction cone corresponding to a half-angle of 55°, it is advantageous to select an orientation for the portion 11d so that it corresponds to an angle relative to the normal of 60°, i.e. 55°+5°, where 5° is an additional safety margin.

In the above example (holding force of 400 N), this makes it possible to reduce the force that the electromagnet needs to develop to a range of 40 N to 120 N.

Piston Reinforcing Ring

The part 11 which bears against the piston may deform it because of the high levels of force applied thereto.

Figure 5B:
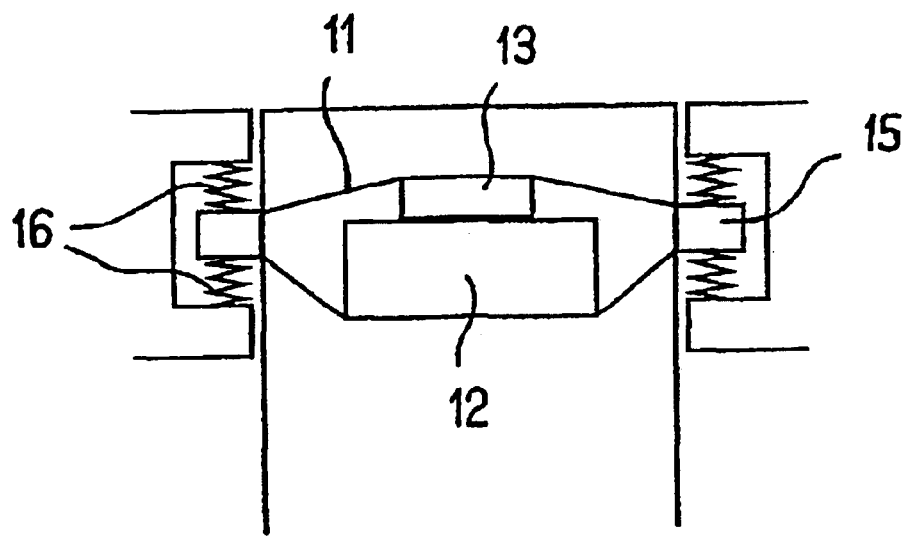

That is why it can be necessary to place a ring 15 outside the piston for sliding in register with its bearing zone on said part 11. As shown in FIGS. 5a and 5b, this ring 15 is advantageously held in place axially between two springs 16 of low stiffness which exert axial forces on said ring.

Such a disposition makes it possible to avoid the ring interfering with displacements of the piston.

When the part 11 expands inside the guide skirt 3, the skirt deforms and presses against the inside of the ring 15 (FIG. 5b).

However, when the electromagnet 13 is released, the skirt 3 slides within the ring 15.

What is claimed is:

1. A linear actuator comprising a body having a piston and a rotary electric motor mounted thereon, together with means which are interposed between the electric motor and the piston and which define a mechanical system that transforms the rotary movements of the motor into linear displacements of said piston, the electric motor being a vibration type motor comprising at least a stator and a rotor together with excitation means for deforming said stator and/or said rotor in modes of vibration that combine tangential vibration with normal vibration so as to drive the rotor in rotation, the means interposed between the electric motor and the piston including means which mechanically decouple said piston from said electric motor when the electrical power supply thereto is interrupted, said means comprising an electromagnet suitable for holding a complementary pole piece in a given position when it is powered, the actuator being characterized in that the piston is secured to a skirt suitable for sliding on the body in order to guide the piston in its axial displacement, the electromagnet and/or the pole piece acting on a part which becomes blocked by friction against the guide skirt which is secured to the piston, or on the contrary becomes disengaged, depending on whether or not the electromagnet is powered.

2. A linear actuator according to claim 1, characterized in that the part which becomes blocked by friction against the guide skirt secured to the piston is a part that is generally bell-shaped, presenting firstly a foot-forming portion secured to one or other of the two parts constituting the electromagnet and the pole piece, and secondly a dome-forming portion which is secured to the other one of said two parts and which constitutes a spring that, when the electromagnet is powered and the pole piece is pressed there against pushes back an intermediate portion between the dome-forming portion and the foot-forming portion so as to block said intermediate portion and the bell-forming part as a whole by friction against the guide skirt secured to the piston.

3. An actuator according to claim 2, characterized in that the electromagnet is suitable for being displaced axially towards the piston by an element presenting a thread that meshes with the thread of a nut-forming part, which is itself driven in rotation by the vibration motor, actuation of the vibration motor causing the part which meshes with the nut-forming part and the electromagnet to be displaced axially.

4. An actuator according to claim 3, characterized in that the element presenting a thread which meshes with the thread of the nut-forming part to drive the electromagnet in axial displacement is a hollow element in which there is received a spring that is compressed with some minimum level of prestress between an end wall presented by said hollow element and a part which is suitable for sliding in said hollow element and for coming into abutment against the electromagnet, the actuator including means for acting, where appropriate, to cause the vibration motor to exert a force that is greater than the prestress of the spring.

5. An actuator according to claim 3 or claim 4, characterized in that the electromagnet, the pole piece, and the element which meshes with the nut-forming part have a rod passing axially therethrough which is terminated by a bearing head suitable for coming into abutment against the pole piece, said rod having an outside thread which co-operates with a complementary thread presented by the nut-forming part, a second rotary motor being suitable for rotating said rod and thus driving it in axial displacement by virtue of its thread co-operating with the complementary thread presented by the nut-forming part.

6. An actuator according to claim 2, characterized in that the guide skirt and the intermediate portion of the bell-forming part which is designed to become blocked by friction against said guide skirt are coated in a pair of friction layers presenting static and dynamic coefficients of friction which are greater than 0.6 for stress between the skirt and the piston of less than 100 MPa, said pair of friction layers further presenting surface states such that:

their roughness radii of curvature R satisfy:
0.005 mm<<R<<1 mm; and the arithmetic mean wavelength $\lambda_a$ and the rms wavelength $\lambda_q$ of the roughness satisfy:
0.5 μm<$\lambda_q$ and $\lambda_a$<10 μm.

7. An actuator according to claim 2, characterized in that when the electromagnet is stuck, the dome-forming portion forms an angle of 0.5° or less relative to a plane perpendicular to the axis of the piston.

8. An actuator according to claim 2, characterized in that the foot-forming portion of the dome-forming part is connected to the intermediate portion that forms a friction zone via a portion that lies substantially in the vicinity of the friction cone.

9. An actuator according to claim 2, characterized in that it includes a ring surrounding the guide skirt in the immediate vicinity of its zone that is designed to be engaged by the bell-forming part.

10. An actuator according to claim 9, characterized in that it includes spring-forming means which hold said ring in the axial direction relative to the guide skirt.

11. An aircraft brake, characterized in that it includes friction disks and an actuator comprising a body having a piston and a rotary electric motor mounted thereon, together with means which are interposed between the electric motor and the piston and which define a mechanical system that transforms the rotary movements of the motor into linear displacements of said piston, the electric motor being a vibration type motor comprising at least a stator and a rotor together with excitation means for deforming said stator and/or said rotor in modes of vibration that combine tangential vibration with normal vibration so as to drive the rotor in rotation, the means interposed between the electric motor and the piston including means which mechanically decouple said piston from said electric motor when the electrical power supply thereto is interrupted, said means comprising an electromagnet.

* * * * *